(12) United States Patent
Hirakawa et al.

(10) Patent No.: US 11,820,488 B2
(45) Date of Patent: Nov. 21, 2023

(54) IMAGE CAPTURING METHOD

(71) Applicant: REDDOTDRONEJAPAN CO., LTD., Kyoto (JP)

(72) Inventors: Akira Hirakawa, Kyoto (JP); Nozomu Miura, Kyoto (JP)

(73) Assignee: REDDOTDRONEJAPAN CO., LTD., Kyoto (JP)

( * ) Notice: Subject to any disclaimer, the term of this patent is extended or adjusted under 35 U.S.C. 154(b) by 581 days.

(21) Appl. No.: 17/055,486

(22) PCT Filed: Jan. 30, 2020

(86) PCT No.: PCT/JP2020/003532
§ 371 (c)(1),
(2) Date: Nov. 13, 2020

(87) PCT Pub. No.: WO2020/158892
PCT Pub. Date: Aug. 6, 2020

(65) Prior Publication Data
US 2021/0107627 A1    Apr. 15, 2021

(30) Foreign Application Priority Data

Jan. 31, 2019    (JP) ................................ 2019-015572

(51) Int. Cl.
*B64D 47/08*    (2006.01)
*B64C 13/06*    (2006.01)
(Continued)

(52) U.S. Cl.
CPC ............ *B64C 13/06* (2013.01); *B64C 39/024* (2013.01); *B64D 47/08* (2013.01); *B64U 2101/30* (2023.01); *B64U 2201/10* (2023.01)

(58) Field of Classification Search
CPC ....... B64C 13/16; B64C 39/024; B64D 47/08; B64U 2201/10; B64U 2101/30
See application file for complete search history.

(56) References Cited

U.S. PATENT DOCUMENTS

2017/0220037 A1\*    8/2017    Berestov .............. G05D 1/0094
2018/0217589 A1\*    8/2018    Kim .................... H04N 23/631

FOREIGN PATENT DOCUMENTS

JP    2015191254 A    11/2015
JP    2016200700 A    12/2016
(Continued)

OTHER PUBLICATIONS

European Search Report and Written Opinion dated Sep. 15, 2022 for related European Patent Application No. 20748854.5.
(Continued)

*Primary Examiner* — Tye William Abell (57) ABSTRACT

To provide an aircraft of which flight efficiency can be improved. An image capturing method according to this embodiment is a method for capturing an image of an object to be photographed by using a plurality of aircrafts including an image capturing part. The image capturing method includes a ranking step of setting up a predetermined ranking for each of the aircrafts, a control step of performing control on the basis of the ranking, and an image capturing step of moving the aircraft and using the image capturing part to capture an image of the object. According to this configuration, a plurality of aircrafts can be used to capture images of a plurality of objects to be photographed simultaneously from different angles.

20 Claims, 6 Drawing Sheets

(51) Int. Cl.
 *B64C 39/02* (2023.01)
 *B64U 101/30* (2023.01)

(56) References Cited

FOREIGN PATENT DOCUMENTS

| | | |
|---|---|---|
| JP | 2018173960 A | 11/2018 |
| JP | 2020123218 A | 8/2020 |
| WO | 2017057157 A1 | 4/2017 |
| WO | WO2020158892 A1 | 8/2020 |

OTHER PUBLICATIONS

Lyu et al., "Simultaneously Multi-UAV Mapping and Control with Visual Servoing", Published in International Conference on Unmanned Aircraft Systems (ICUAS), IEEE; Jun. 9-12, 2015; pp. 125-131, Denver, Colorado, USA.
Notification of reasons for refusal dated Dec. 1, 2022 for Japanese Patent Application No. 2019-015572.

* cited by examiner

IMAGE CAPTURING METHOD

TECHNICAL FIELD

The present invention relates to an image capturing method, and more particularly, to an image capturing method for capturing an image of an object to be photographed by using a plurality of aircrafts.

BACKGROUND ART

In recent years, a variety of services is offered which uses a rotorcraft and an aircraft (hereinafter, collectively referred to as an "aircraft" simply) such as an unmanned aerial vehicle (UAV) represented by a drone used for various purposes.

On the other hand, Patent Literature 1 discloses a system in which a plurality of aircrafts is controlled to work in coordination to fulfil a specific purpose (gas detection).

CITATION LIST

Patent Literature

Patent Literature 1: JP 2016-200700 A

SUMMARY OF INVENTION

Technical Problem

A flying device of Patent Literature 1 has a technique for using sensors of a plurality of aircrafts to detect gas leakage in a specific region.

The present invention provides a system demonstrating a new function that can be achieved by controlling a plurality of aircrafts to work in coordination.

Solution to Problem

According to the present invention, there is provided an image capturing method for capturing an image of an object to be photographed by using a plurality of aircrafts including an image capturing part, the method including:
a ranking step of setting up a predetermined ranking for each of the aircrafts;
a control step of performing control on the basis of the ranking; and
an image capturing step of moving the aircraft and using the image capturing part to capture an image of the object.

Advantageous Effects of Invention

The present invention provides new aerial photography that can be achieved by controlling a plurality of aircrafts to work in coordination.

DESCRIPTION OF EMBODIMENTS

The content of an embodiment of the present invention is listed and described. An image capturing method according to the embodiment of the present invention includes configurations provided below.

[Item 1]
An image capturing method for capturing an image of an object to be photographed by using a plurality of aircrafts including an image capturing part, the method including:
a ranking step of setting up a predetermined ranking for each of the aircrafts;
a control step of performing control on the basis of the ranking; and
an image capturing step of moving the aircraft and using the image capturing part to capture an image of the object.

[Item 2]
The image capturing method according to item 1, in which
the ranking step further includes
a step of setting, from the plurality of aircrafts, a master device and at least one slave device or more, and
the slave device is controlled to fly in accordance with a flight state of the master device.

[Item 3]
The image capturing method according to item 1, in which
the ranking step further includes
a step of setting, from the plurality of aircrafts, a plurality of master devices and at least one slave device or more corresponding to one of the master devices, and
the slave device is controlled to fly in accordance with a flight state of the master device.

[Item 4]
The image capturing method according to item 1, in which
the ranking step further includes
a step of setting up an equal ranking for the plurality of aircrafts, and
each of the aircrafts is controlled to fly in accordance with a flight state of each of the aircrafts.

[Item 5]
The image capturing method according to any one of items 2 to 4, in which
the ranking step includes
a first ranking step of setting up a ranking of the aircraft to a first state, and
a second ranking step of setting up a ranking of the aircraft to a second state different from the first state.

[Item 6]
The image capturing method according to any one of items 1 to 5, including
a step of receiving operation on at least one of the plurality of aircrafts or more, and
a step in which the aircraft is controlled on the basis of the operation.

[Item 7]

The image capturing method according to any one of items 1 to 6, in which in the image capturing step, movement is controlled on the basis of a relative position of the plurality of aircrafts.
[Item 8]

The image capturing method according to any one of items 1 to 7, in which in the image capturing step, movement is controlled on the basis of a movement path of the plurality of aircrafts.
[Item 9]

The image capturing method according to any one of items 1 to 8, in which in the image capturing step, in accordance with an orientation of the image capturing part of one of the aircrafts, flight of the other aircrafts is controlled.
[Item 10]

The image capturing method according to any one of items 1 to 9, in which in the image capturing step, in accordance with an operation state of the image capturing part of one of the aircrafts, flight of the other aircrafts is controlled.
[Item 11]

The image capturing method according to item 10, in which in the image capturing step, in accordance with an image capture range of the image capturing part of one of the aircrafts, flight of the other aircrafts is controlled.
[Item 12]

The image capturing method according to any one of items 1 to 11, in which in the image capturing step, in accordance with an image capture range of the image capturing part of one of the aircrafts, flight of the other aircrafts is controlled.

Details of Embodiment According to the Present Invention

An image capturing method according to an embodiment of the present invention is hereinafter described with reference to the drawings. The embodiment described below is merely an example, and other known elements and alternative means may be employed in accordance with the application, purpose, scale, or the like.

Configuration of the Present Invention

Figure 1:
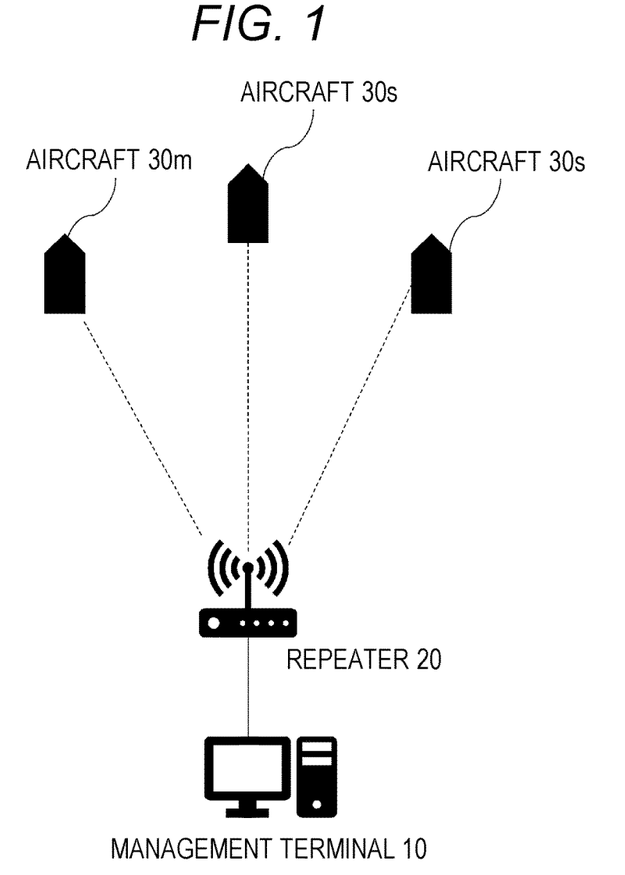
FIG. 1 is a configuration diagram of an image capturing system according to the present invention.

As illustrated in FIG. 1, an image capturing system embodying the image capturing method according to the present invention includes a management terminal 10, a repeater 20, an aircraft 30m, and aircrafts 30s (the aircraft 30m and the aircrafts 30s may be collectively referred to as an "aircraft 30"). The number of aircrafts illustrated in FIG. 1 is three for simplicity of explanation; however, the number thereof is not limited thereto.

Flight information (described later) of each of the aircrafts 30m and 30s is sent to the management terminal 10 via the repeater 20. In this embodiment, the aircraft 30 and the management terminal 10 are connected to each other via the repeater 20; however, the aircraft 30 may send the flight information directly to the management terminal 10. Alternatively, one of the aircrafts may serve as a so-called hub to collectively send flight information on all of the other aircrafts to the management terminal 10.

Hardware Configuration: Management Terminal

Figure 2:
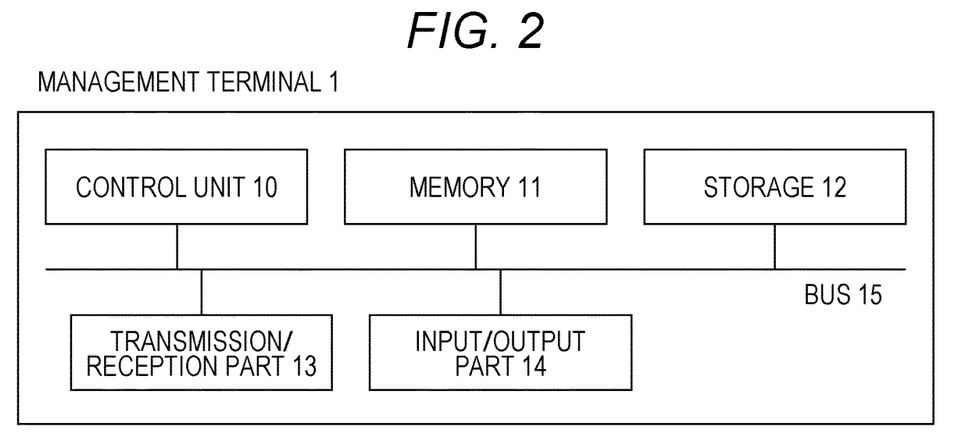
FIG. 2 is a functional block diagram that illustrates the configuration of a management terminal illustrated in FIG. 1.

FIG. 2 is a diagram that illustrates the hardware configuration of the management terminal 10. The illustrated configuration is an example, and the management terminal 10 may have another configuration.

As illustrated, the management terminal 10 is connected to a database 3 to constitute a part of the system. The management terminal 10 may be a general-purpose computer such as a workstation or a personal computer, or may be logically implemented by cloud computing.

The management terminal 10 includes at least a processor 10, a memory 11, a storage 12, a transmission/reception part 13, and an input/output part 14, all of which are electrically connected to one another via a bus 15.

The processor 10 is a computing device that controls the operation of the entire management terminal 10, controls transmission and reception of data between the elements, and performs information processing necessary for application execution and authentication processing, and so on. For example, the processor 10 is a central processing unit (CPU) which executes programs and the like stored in the storage 12 and deployed in the memory 11 to carry out various information processing.

The memory 11 includes a main storage implemented by a volatile storage device such as a dynamic random access memory (DRAM) and an auxiliary storage implemented by a non-volatile storage device such as a flash memory or a hard disk drive (HDD). The memory 11 is used as, for example, a work area of the processor 10 and stores a basic input/output system (BIOS) executed at the start of the management terminal 10, and various setting information.

The storage 12 stores various programs such as application programs. A database storing data used for various processing may be built in the storage 12.

The transmission/reception part 13 may connect the management terminal 10 to a network. The transmission/reception part 13 may be provided with a short-range communication interface for Bluetooth (registered trademark) and Bluetooth low energy (BLE).

The input/output part 14 is an information input device such as a keyboard and a mouse and an output device such as a display.

The bus 15 is connected to the elements described above in common and sends, for example, an address signal, a data signal, and various control signals thereto.

Hardware Configuration: Aircraft

The aircraft 30 in this embodiment is sometimes called a drone (Drone), a multicopter (Multicopter), an unmanned aerial vehicle (UAV), remote piloted aircraft systems (RPAS), or unmanned aircraft systems (UAS), or the like.

Figure 3:
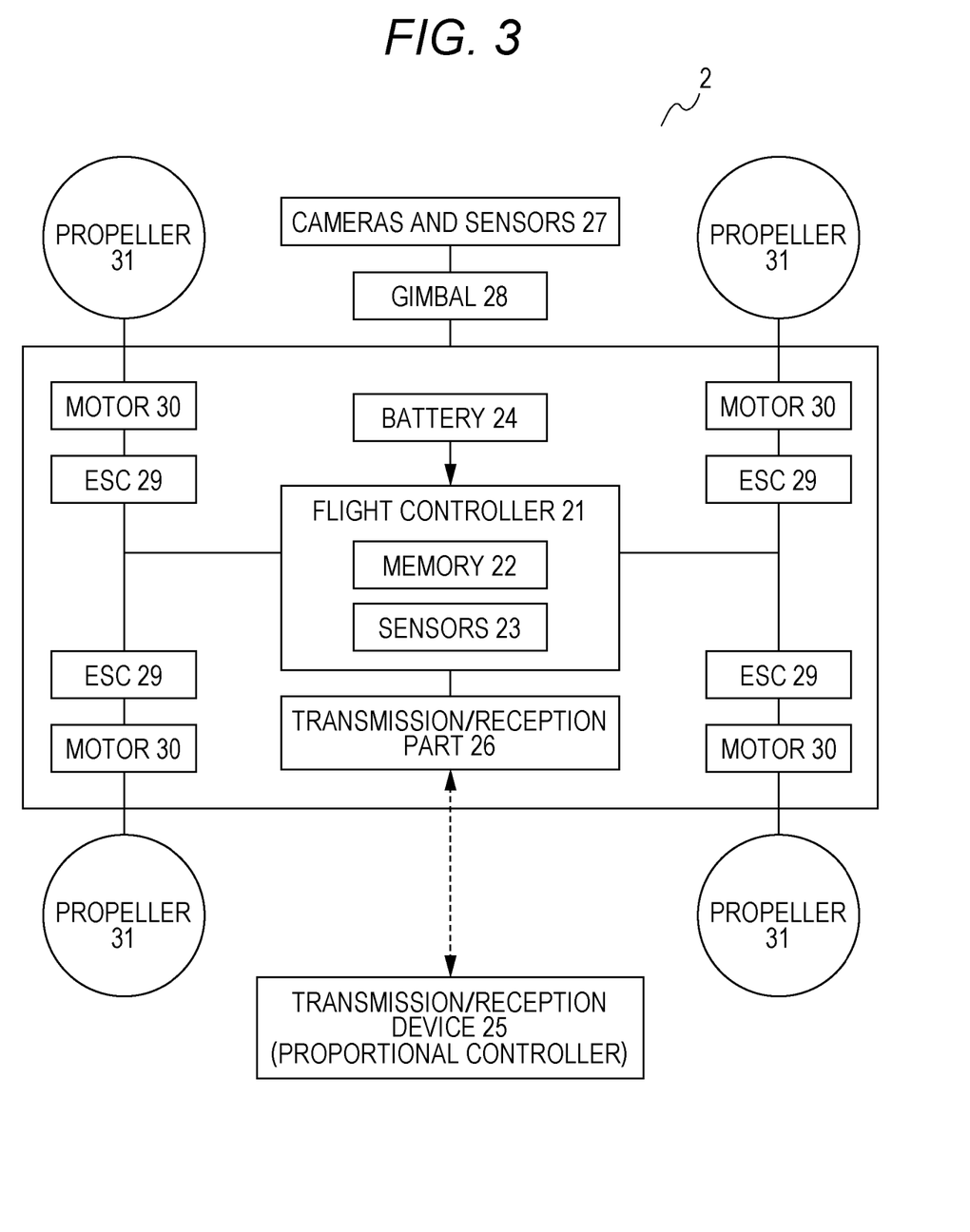
FIG. 3 is a functional block diagram that illustrates the configuration of an aircraft illustrated in FIG. 1.

The aircraft 30 has a functional block illustrated in FIG. 3. The functional block illustrated in FIG. 2 is a minimum reference configuration.

A flight controller is a so-called processing unit. The processing unit can have one or more processors, such as a programmable processor (central processing unit (CPU), for example). The processing unit has a memory 22 and can access the memory 22. The memory 22 stores a logic, code, and/or program instructions that can be executed by the processing unit to perform one or more steps. The memory may include, for example, a separable medium such as an SD card or a random access memory (RAM), or an external storage device. Data acquired from cameras and sensors 27 may be directly sent to the memory 22 and stored therein. For example, data on still image/moving image captured by a camera or the like is recorded in an internal memory or an external memory.

The processing unit includes a control module configured to control the state of an aircraft. For example, the control module controls a propulsion mechanism (motor or the like) of the aircraft to adjust the spatial arrangement, speed, and/or acceleration of the aircraft with six degrees of freedom (translational motions x, y and z, and rotational motions $\theta_x$, $\theta_y$, and $\theta_z$). The control module can control one or more of the states of a mounting part and the sensors.

The processing unit is capable of performing communication with a transmission/reception part configured to send and/or receive data from one or more external devices (terminal, display device, or another remote controller, for example). A transmission/reception part can use any appropriate communication means such as wired communication or wireless communication. For example, the transmission/reception part can use one or more of the following: local area network (LAN), wide area network (WAN), infrared, wireless, WiFi, point-to-point (P2P) network, telecommunication network, and cloud communication. The transmission/reception part can send and/or receive one or more of the following: data acquired by the sensors, processing results generated by the processing unit, predetermined control data, and user command from a terminal or a remote controller.

The sensors according to this embodiment may include an inertial sensor (acceleration sensor, gyro sensor), a GPS sensor, a proximity sensor (rider, for example), or a vision/image sensor (camera, for example).

Hardware Configuration: Repeater

In this embodiment, the repeater 20 is installed between the aircrafts 30 and the management terminal 10. In other words, a signal indicating a flight state that is inputted from each of the aircrafts 30 to the management terminal 10 and a control signal outputted from the management terminal 10 to each of the aircrafts 30 are all conveyed via the repeater 20. However, the configuration according to this embodiment is not limited thereto. For example, (a part or all of) the aircrafts 30 and the management terminal 10 may perform direct communication with each other. Further, the communication means is not limited to an IP-based computer network, and may be a carrier network for mobile phones, smartphones, and so on (which can use communication means such as 4G-LTE, 5G, and so on), bandwidth of LPWA networks (SIGFOX, LoRa (LoRa WAN), Wi-Fi HaLow, Wi-SUN, RPMA, Flexnet, IM920, Cat.M1, Cat.NB1, and other standards) (by themselves or in combination).

Data: Flight Information

In this embodiment, the data acquired from the aircraft may include positional information, altitude information, speed information, battery level, signal intensity, camera image information, camera direction, zooming in/out, and any other data that can be obtained from the sensors of the aircraft 30.

In addition, each of the aircrafts 30 has information on its own rank (principal and subordinate). The lower ranked aircraft 30 flies according to the higher ranked aircraft 30, and the subordinate aircraft 30 flies according to the principal aircraft 30. The ranking is set up by a user. Further, the ranking may be fixed from the beginning, something may bring a change in ranking, or the user may change the ranking manually.

Control Example 1

Figure 4:
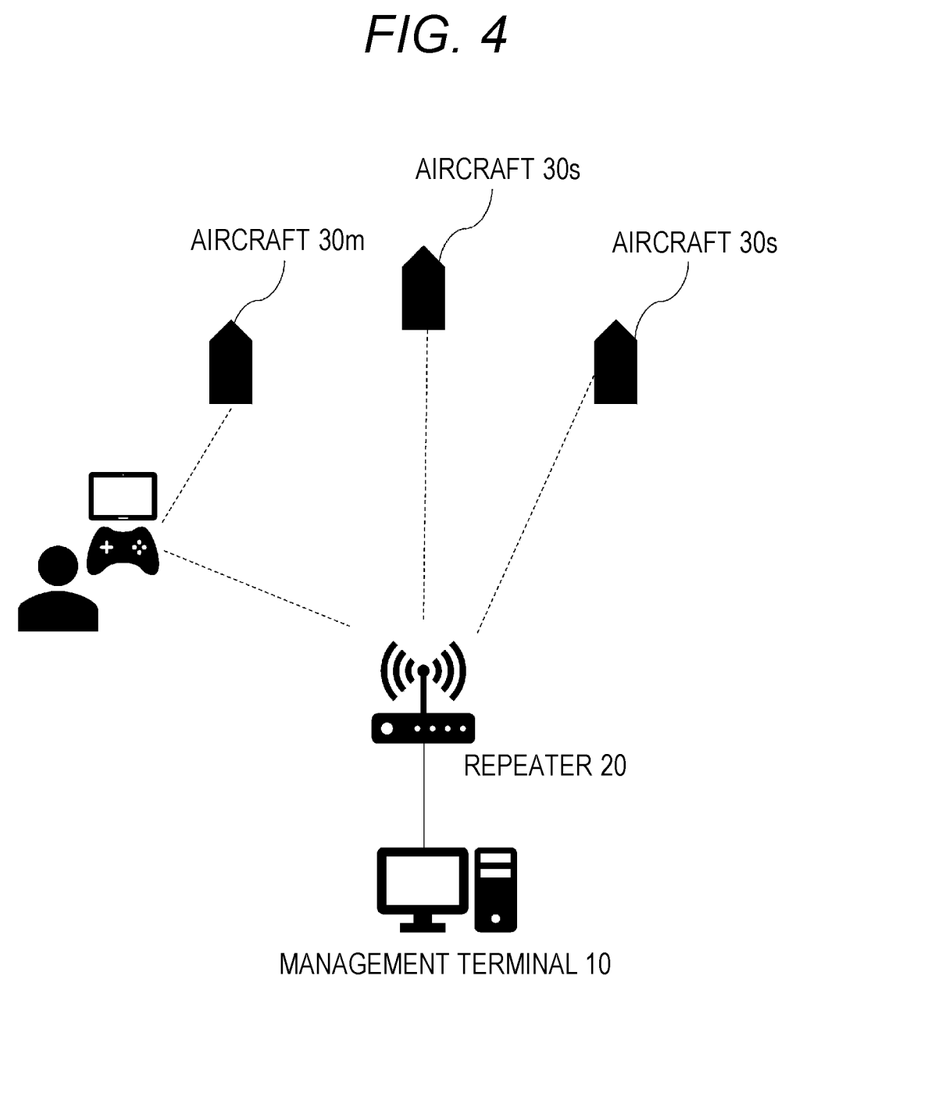
FIG. 4 is another configuration diagram of an image capturing system according to the present invention.

Hereinafter, description is given of an example 1 of flight control according to this embodiment with reference to FIGS. 4 and 5. In this control example, as illustrated in FIG. 4, the aircraft 30m is ranked as a master device, and the two aircrafts 30s are ranked as slave devices.

Further, in the illustrated example, the user uses a proportional controller or the like to manually fly the aircraft 30m. The aircrafts 30s are controlled to keep equidistant according to the aircraft 30m. In other words, the aircraft 30m and the aircrafts 30s fly as a group while maintaining the initial three-dimensional relative positional relationship. Hereinafter, in the description, the "aircraft 30m" is referred to as a "master device 30m" and the "aircraft 30s" is referred to as a "slave device 30s".

Figure 5:
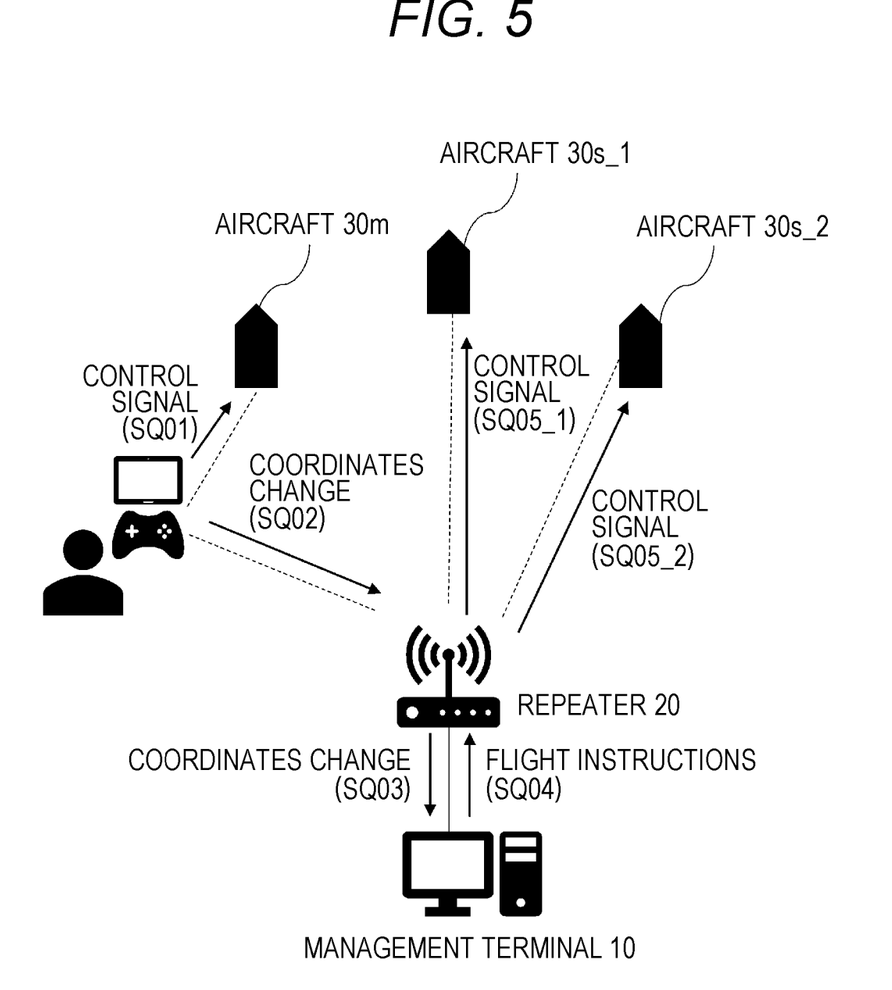
FIG. 5 is a diagram that illustrates the movement of information in the configuration of FIG. 4.

More specifically, as illustrated in FIG. 5, the user uses the proportional controller at hand to control the master device 30m. With this control, the proportional controller sends a control signal to the master device 30m (SQ01), and coordinate information regarding movement is inputted to the terminal 10 via the repeater 20 (SQ02, SQ03). The management terminal 10 generates a signal to be sent to the slave device 30s_1 and the slave device 30s_2, and sends, as flight instructions (SQ04), control signals to the slave device 30s_1 and the slave device 30s_2 via the repeater 20 (further via the proportional controller for the slave device 30s_1 and the slave device 30s_2) (SQ05_1 and SQ05-2).

In the control over the aircrafts 30 according to this embodiment, control that is the same as the movement control over the master device 30m is applied to the slave devices 30s. However, the amount of movement of the slave devices 30s is not necessarily exactly the same as that of the master device 30m. For example, another configuration is possible in which movement control is performed over the slave device by reading and calculating some criteria on the basis of the amount of movement of the master device and positional information thereof, such as increasing/decreasing the amount of movement of the slave device and application of a predetermined movement pattern according to the amount of movement of the master device by control with a predetermined parameter added to the amount of movement of the master device 30m.

Figure 6:
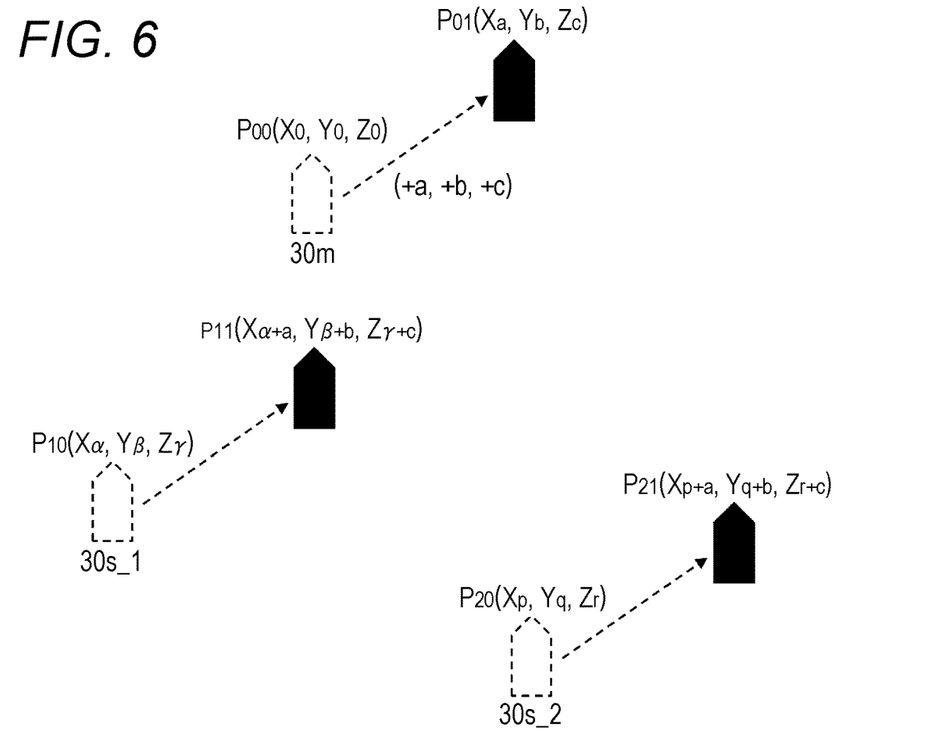
FIG. 6 is a diagram that illustrates the control over each aircraft by means of the system illustrated in FIG. 1.

As illustrated in FIG. 6, the master device 30m is moved from the initial position $P_{00}$ to $P_{01}$ and operated in accordance with the control signal described above. At this time, in a case where the spatial coordinates at the initial position $P_{00}$ of the master device 30m are expressed as $(X_0, Y_0, Z_0)$, the position coordinates after the user moves can be expressed as $P_{01}$ $(X_a, Y_b, Z_c)$. The amount of change in coordinates from the initial position $P_{00}$ to the destination $P_{01}$ are set at (+a, +b, +c).

When the master device 30m moves as described above, the slave device 30s_1 that has received the control signal moves from the initial position $P_{10}$ $(X_\alpha, Y_\beta, Z_\gamma)$ to $P_{11}$ $(X_{\alpha+a}, Y_{\beta+b}, Z_{\gamma+c})$. Further, the slave device 30s_2 moves from the initial position $P_{20}$ $(X_p, Y_q, Z_r)$ to $P_{21}$ $(X_{p+a}, Y_{q+b}, Z_{r+c})$.

According to such a configuration, a photograph can be taken while the user controls only the master device to maintain the relative positional relationship between the master device and the slave devices in the initial state. The idea of the method for controlling the slave device according to this embodiment is to route the control, which is the same as the control over the master device, to the slave device. Further, although the movement of the slave device 30s_1 and the slave device 30s_2 is controlled at the same timing as that of the master device 30m with almost no delay, a predetermined time difference may be made or the flight speed may be changed.

Control 2

Figure 7:
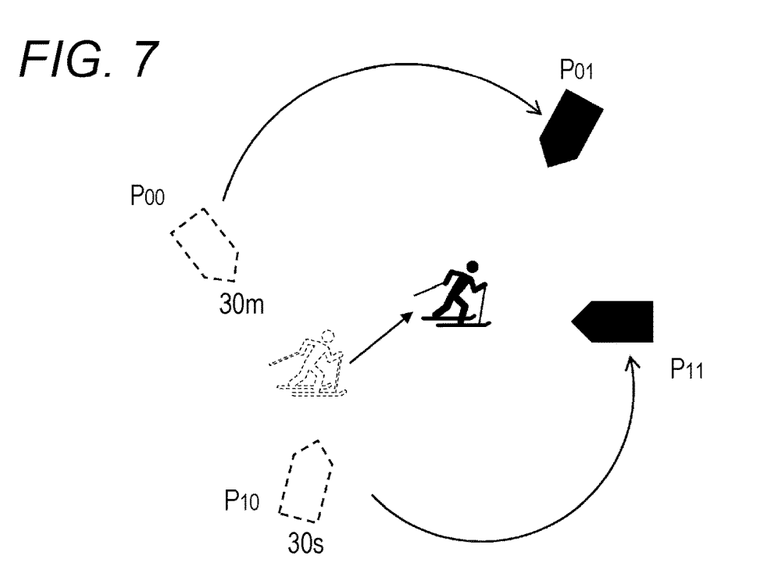
FIG. 7 is another diagram that illustrates the control over each aircraft by means of the system illustrated in FIG. 1.

Next, another control example is described with reference to FIG. 7. As with the example described above, the master device 30*m* is also controlled manually in this control example. As illustrated, the master device 30*m* moves on the left side of a skier from back ($P_{00}$) to front ($P_{01}$) along with the movement of the skier.

Correspondingly, the slave device 30*s* moves on the right side of the skier from back ($P_{00}$) to front ($P_{01}$) along with the movement of the skier symmetrically with respect to the master device 30*m*.

Control 3

In the case of the control example of Control 2, the other party's aircraft may be captured by a camera depending on the altitude of the master device 30*m* and the slave device 30*s*, or the camera orientation. In light of this, for example, in a case where the master device 30*m* is moved and the slave device is included unintentionally in the image capture range at the destination, control is performed such that the slave device is moved out of the image capture range.

Figure 8:
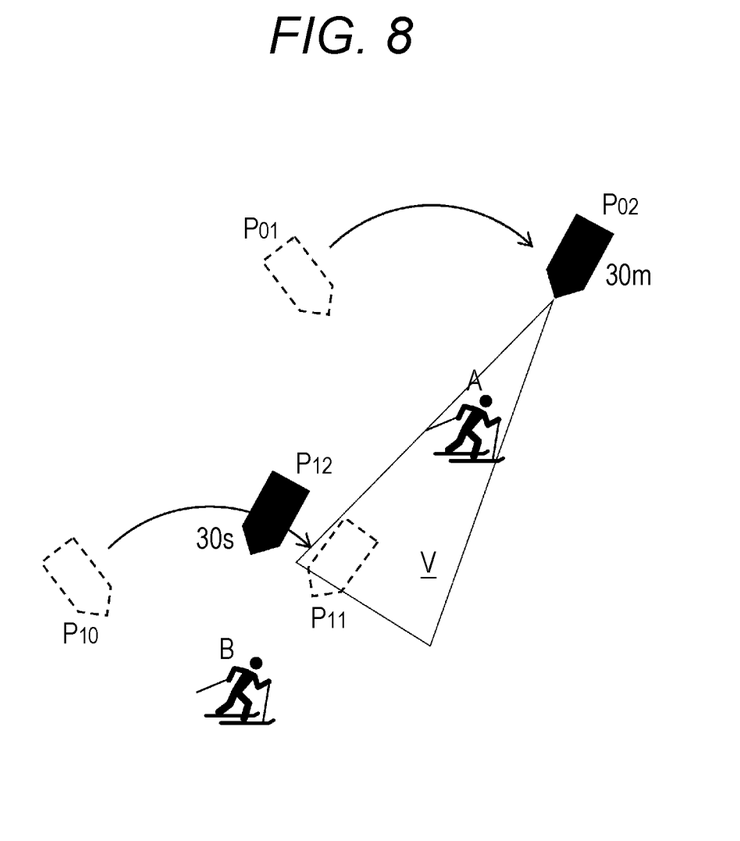
FIG. 8 is yet another diagram that illustrates the control over each aircraft by means of the system illustrated in FIG. 1.

Specifically, as illustrated in FIG. 8, a case is described in which the aircraft 30*m* and the aircraft 30*s* are used to capture images of skiers A and B. In this control example, different users control the aircrafts 30 manually. In a case where a plurality of users operates the aircrafts as described above, it is difficult for each user to take a picture while paying attention to the other aircraft 30.

As illustrated, in order to move the aircraft 30*m* photographing the skier A from $P_{01}$ to $P_{02}$, and further to move the aircraft 30*s* photographing the skier B from $P_{10}$ to $P_{11}$, the image of the aircraft 30*s* at $P_{11}$ may be included in an image capture range V of the aircraft 30*m* at the position of $P_{02}$ as a result of the movement of the aircraft 30*m*.

In such a case, the management terminal 10 (see FIG. 5) acquires information on the image capture range of each aircraft, and when there is a possibility that another aircraft enters the image capture range of each aircraft, the management terminal 10 performs control such that the aircraft does not enter the image capture range. In the illustrated example also, the management terminal 10 controls the aircraft 30*s* to stop at the position of $P_{12}$ in front of $P_{11}$ so that the aircraft 30*s* does not enter the image capture range V.

As described above, according to this embodiment, the aircrafts are controlled as a group, which enables even one object to be photographed simultaneously from various angles.

In addition, for example, the relationship between the master device and the slave devices may be appropriately changed according to predetermined conditions (for example, object competition ranking, attention, and so on).

In addition, as an example of automatic flight control over the slave device 30*s*, the control may be performed according to each other's flight path, the camera orientation, whether or not the camera is recording, the image capture range, and so on.

Further, at least any one of the master device and the slave device may be under automatic flight control. In such a case, it is only required that information on the path (flight route) is inputted to the management terminal 10 in advance.

Further, any of the aircrafts 30 may be responsible for a part or the whole of the functions of the management terminal 10 (alone or separately), and communication may be performed between the aircrafts 30.

The embodiment described above is merely an example for facilitating the understanding of the present invention, and is not intended to limit the interpretation of the present invention. It goes without saying that the present invention can be modified and improved without departing from the spirit thereof and the present invention includes an equivalent thereof.

REFERENCE SIGNS LIST

10 Management terminal
20 Repeater
30, 30*m*, 30*s* Aircraft

The invention claimed is:

1. An image capturing method for capturing an image of an object to be photographed by using a plurality of aircraft, each aircraft including an image capturing part, the method comprising:
   a ranking step of setting up a predetermined ranking for each of the aircrafts;
   a control step of performing control on the basis of the ranking; and
   an image capturing step of moving one of the aircraft and using the image capturing part of one of the aircraft to capture an image of the object;
   wherein, in the image capturing step, in accordance with an image capture range of the image capturing part of one of the aircraft, flight of the other aircraft is controlled such that the other aircraft do not enter the image capture range.

2. The image capturing method according to claim 1, comprising:
   a step of receiving a control signal on at least one of the plurality of aircraft, and
   a step in which the at least one of the plurality of aircraft is controlled on the basis of the control signal.

3. The image capturing method according to claim 1, wherein:
   in the image capturing step, movement of the other aircraft is controlled on the basis of a relative position of the one of the aircraft.

4. The image capturing method according to claim 1, wherein:
   in the image capturing step, movement of the other aircraft is controlled on the basis of a movement path of the one of the aircraft.

5. The image capturing method according to claim 1, wherein:
   in the image capturing step, in accordance with an orientation of the image capturing part of one of the aircraft, flight of the other aircraft is controlled.

6. The image capturing method according to claim 1, wherein
   in the image capturing step, in accordance with an image capture range of the image capturing part of one of the aircraft, flight of the other aircraft is controlled.

7. The image capturing method according to claim 1, wherein:
   in the image capturing step, in accordance with an operation state of the image capturing part of one of the aircraft, flight of the other aircraft is controlled.

8. The image capturing method according to claim 7, wherein:
   in the image capturing step, in accordance with an image capture range of the image capturing part of one of the aircraft, flight of the other aircraft is controlled.

9. The image capturing method according to claim 1, wherein the ranking step further includes:
   a step of setting up an equal ranking for the plurality of aircraft, and each of the aircraft are controlled to fly in accordance with a flight state of each of the aircraft.

10. The image capturing method according to claim 9, wherein:
the ranking step includes a first ranking step of setting up a ranking of one of the plurality of aircraft to a first state, and
a second ranking step of setting up a ranking of the other aircraft to a second state different from the first state.

11. The image capturing method according to claim 9, comprising:
a step of receiving a control signal on at least one of the plurality of aircraft, and
a step in which the at least one of the plurality of aircraft is controlled on the basis of the control signal.

12. The image capturing method according to claim 1, wherein the ranking step further includes:
a step of setting, from the plurality of aircraft, a plurality of master device aircraft and at least one slave device aircraft corresponding to one of the master device aircraft, and
the slave device aircraft is controlled to fly in accordance with a flight state of one of plurality of the master device aircraft.

13. The image capturing method according to claim 12, wherein the ranking step includes:
a first ranking step of setting up a ranking of one of the plurality of aircraft to a first state, and
a second ranking step of setting up a ranking of the other aircraft to a second state different from the first state.

14. The image capturing method according to claim 12, comprising:
a step of receiving a control signal on at least one of the plurality of aircraft, and
a step in which the at least one of the plurality of aircraft is controlled on the basis of the control signal.

15. The image capturing method according to claim 12, wherein:
in the image capturing step, movement of the other aircraft is controlled on the basis of a relative position of the one of the aircraft.

16. The image capturing method according to claim 1, wherein the ranking step further includes:
a step of setting, from the plurality of aircraft, a master device aircraft and at least one slave device aircraft, and
the slave device aircraft is controlled to fly in accordance with a flight state of the master device aircraft.

17. The image capturing method according to claim 16, comprising:
a step of receiving a control signal on at least one of the plurality of aircraft, and
a step in which the at least one of the plurality of aircraft is controlled on the basis of the control signal.

18. The image capturing method according to claim 16, wherein:
in the image capturing step, movement of the other aircraft is controlled on the basis of a relative position of the one of the aircraft.

19. The image capturing method according to claim 16, wherein the ranking step includes:
a first ranking step of setting up a ranking of one of the plurality of aircraft to a first state, and
a second ranking step of setting up a ranking of the other aircraft to a second state different from the first state.

20. The image capturing method according to claim 19, comprising:
a step of receiving a control signal on at least one of the plurality of aircraft, and
a step in which the at least one of the plurality of aircraft is controlled on the basis of the control signal.

* * * * *